US007444229B1

(12) United States Patent
Mischler et al.

(10) Patent No.: US 7,444,229 B1
(45) Date of Patent: Oct. 28, 2008

(54) SYSTEM AND METHOD FOR DETECTING AND RESPONDING TO FUGITIVE FUELING OF AN INTERNAL COMBUSTION ENGINE

(75) Inventors: James R. Mischler, Girard, PA (US); Luke M. Henry, Erie, PA (US); Nikita Goel, Erie, PA (US); Kyle C. Stott, Erie, PA (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 11/871,222

(22) Filed: Oct. 12, 2007

(51) Int. Cl.
*G06F 19/00* (2006.01)
*F02N 11/06* (2006.01)

(52) U.S. Cl. .......................................... 701/104

(58) Field of Classification Search ......... 701/103–105; 123/480
See application file for complete search history.

(56) References Cited

U.S. PATENT DOCUMENTS

| | | | | |
|---|---|---|---|---|
| 5,646,341 | A | 7/1997 | Schricker et al. | |
| 2008/0054647 | A1 * | 3/2008 | Kumar ..................... | 290/40 R |

* cited by examiner

*Primary Examiner*—Hieu T Vo
(74) *Attorney, Agent, or Firm*—Dickinson Wright PLLC

(57) ABSTRACT

A method for detecting and responding to fugitive fueling of an internal combustion engine uses monitoring of the variability of at least one fuel-linked engine operating parameter to determine that fugitive fueling is occurring. Once fugitive fueling is detected, mitigation will be implemented so as to shut the engine down without consequential damage.

17 Claims, 4 Drawing Sheets

SYSTEM AND METHOD FOR DETECTING AND RESPONDING TO FUGITIVE FUELING OF AN INTERNAL COMBUSTION ENGINE

CROSS REFERENCE TO RELATED APPLICATIONS

None.

BACKGROUND OF THE INVENTION

1. Field of the Invention

The subject matter disclosed herein relates to the detection and response of unwanted fueling of an internal combustion engine.

2. Discussion of the Prior Art

As used herein, the term "fugitive fueling" means a phenomenon in which an engine receives fuel in excess of that which a fuel controller intends to deliver, either by injectors or by another fuel delivery device. Fugitive fueling may occur in a variety of situations. For example, if an engine is operated in a hydrocarbon-contaminated atmosphere such as could occur in the event of a spill at a petroleum transfer terminal or a recycling facility, sufficient unwanted or fugitive hydrocarbons may be inducted by the air system of an engine to cause overspeed and severe engine damage. A mishap such as a vehicular accident or train wreck may create a fugitive fueling situation, too.

Another type of fugitive fueling occurs due to a leak in an engine lubrication system. Such a leak may occur in a turbocharger or other component connected with the engine's air inlet system. Those skilled in the art will appreciate that engines, particularly diesel engines, are capable of operating quite well on lubricating oil, including lubricating oil aspirated into the engine's cylinders as a result of leaking turbocharger seals, or failed turbocharger bearings, or as a result of damage inflicted by dropped poppet valves, or yet other sorts of internal leak paths which result in oil being inducted into the engine's air inlet system. Yet another type of fugitive fueling may occur if a fuel injector is severely impaired, so that the injector either flows more than it is directed to flow, or simply leaks.

A need exists for a system and method for detecting and responding to fugitive fueling prior to overspeeding, thereby allowing an engine to be stopped before uncontrolled operation occurs.

BRIEF DESCRIPTION OF THE INVENTION

According to an aspect of the invention, a method for detecting and responding to fugitive fueling of an internal combustion engine includes monitoring the time-related variability of a fuel-linked engine operating parameter and comparing the monitored variability of the operating parameter with a maximum permissible value for the variability of the operating parameter. If the monitored variability exceeds the maximum permissible value, steps are taken to mitigate improper engine operation resulting from fugitive fueling. In other words, if variability exceeds the maximum permissible value, it is concluded that fugitive fueling is occurring, and mitigation then ensues.

According to another aspect of the present invention, a system for detecting and responding to fugitive fueling of an internal combustion engine includes a controller for monitoring the variability of a fuel-linked engine operating parameter, with a controller including at least one sensor for measuring the value of the fuel-linked operating parameter, and a processor for calculating the variability of the measured operating parameter. A comparator compares the calculated variability of the measured operating parameter with a maximum permissible value for the variability. The controller sets a fugitive fueling flag if the result of the comparison indicates that fugitive fueling is present. Then, at least one engine shut down device, connected with the controller and activated in response to the fugitive fueling flag, stops the engine, notwithstanding the presence of fugitive fueling.

It is an advantage of the present method and system that fugitive fueling may be detected by means of sensors which are currently used with most internal combustion engines having advanced fuel systems.

It is yet another advantage of the present method and system that fugitive fueling may be detected before serious engine damage occurs.

Other advantages, as well as features of the present invention will become apparent to the reader of this specification.

DETAILED DESCRIPTION OF THE PREFERRED EMBODIMENTS

Figure 1:
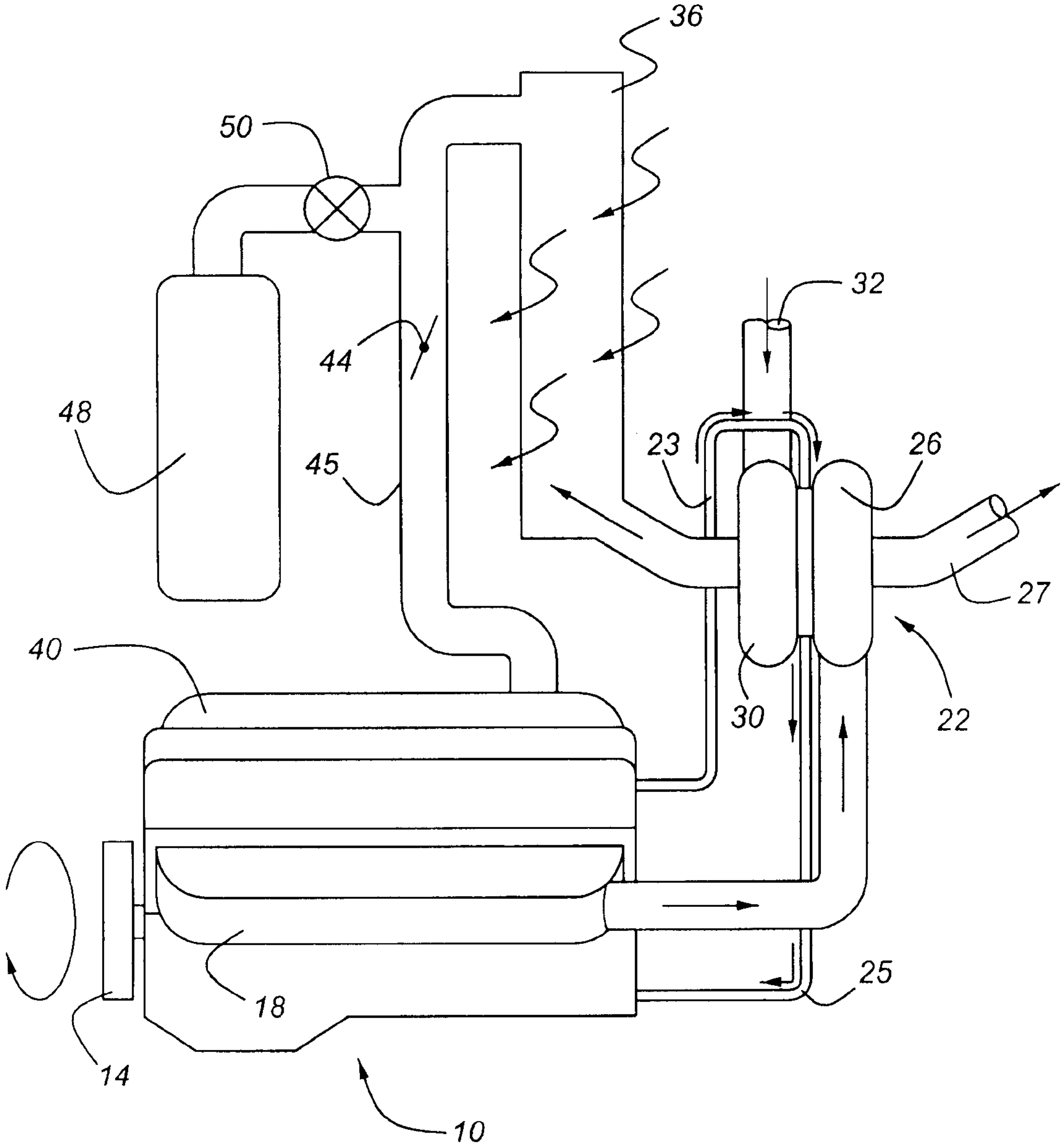
FIG. 1 is a schematic representation of an engine having a system for detecting fugitive fueling according to an aspect of the present invention.
Figure 2:
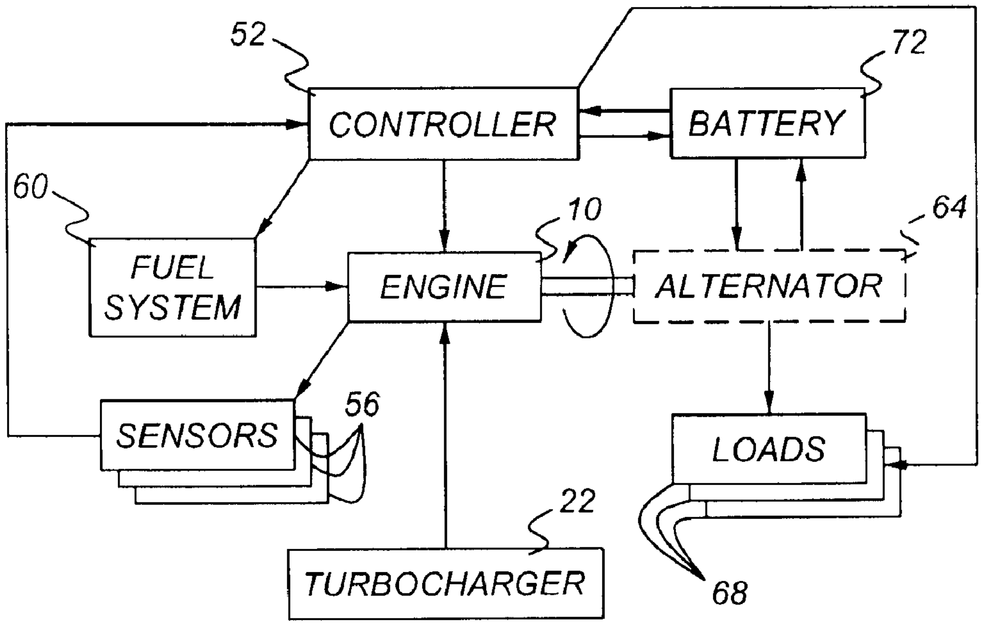
FIG. 2 is a block diagram showing various components of the engine illustrated in FIG. 1.

As shown in FIGS. 1 and 2, engine 10 has a crankshaft, 14, which is coupled to an alternator, 64. This type of arrangement is used in many pieces of engine-driven equipment, such as locomotives and open pit mining trucks and other devices such as stationary power generation systems. Engine 10 has exhaust manifold 18, which provides exhaust to turbocharger 22. Exhaust entering turbocharger 22 passes through exhaust turbine 26 and then through exhaust pipe 27. Turbocharger 22 also includes compressor section 30, which compresses air entering engine 10 through air inlet 32, and then sends the compressed air through intercooler 36 and engine air inlet 45 to intake manifold 40.

Turbocharger 22 is provided with lubricating oil by means of turbo oil supply line 23. Oil having lubricated turbocharger 22 is sent back to engine 10 by means of return oil line 25.

Engine 10 includes emergency shutdown devices such as air shutter 44 and inert gas tank 48. Air shutter 44 cuts off intake air to engine 10 when an emergency shutdown is desired. Inert gas tank 48 fumigates, or infuses, inert gas into the engine's air inlet system through valve 50, which is controlled by controller 52. The inert gas may be such gases as carbon dioxide, argon, or even spent exhaust gas.

FIG. 2 shows additional items of hardware connected with engine 10. Fuel system 60, which is operated by controller 52, may include a number of fuel injectors, with an injector typically being dedicated to each cylinder. A number of sensors, 56, including such sensors as engine oil pressure, charge air temperature, engine speed, fuel delivery, and other types of sensors known to those skilled in the art and suggested by this disclosure, are connected with controller 52 and provide controller 52 with data needed to operate fuel system 60. Controller 52 is also attached to battery 72, which in the case of an engine driving an alternator, is usually an integral part of a traction device, such as a locomotive or other electrodrive vehicle. Alternator 64 is attached to a number of loads 68, which may include a self-load capability including resistive elements which have sufficient capacity to absorb the full rated output of alternator 64.

Figure 3:
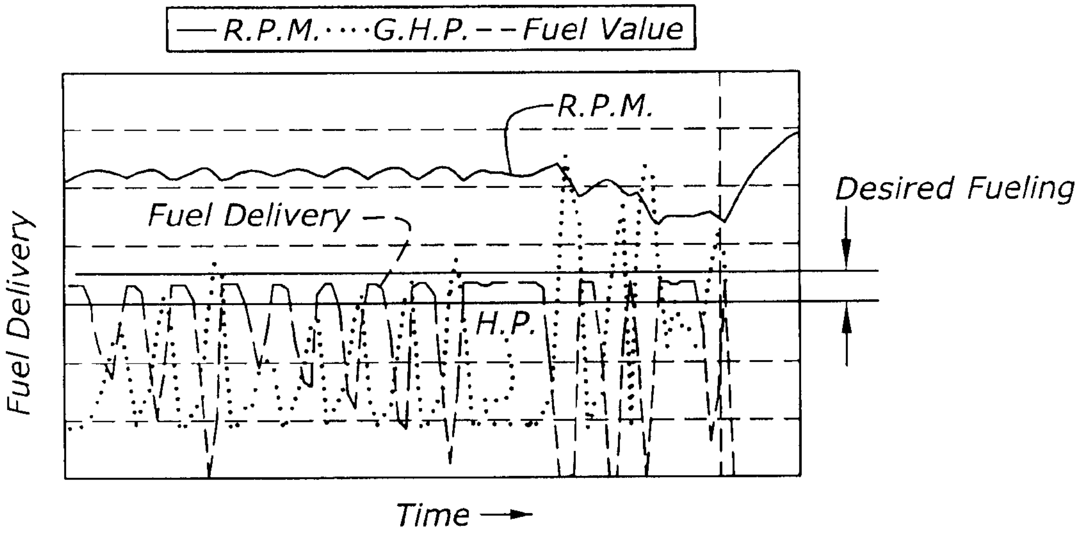
FIG. 3 is a plot of engine operating parameters indicating fuel-linked parameters which may be monitored to detect fugitive fueling.

FIG. 3 is a plot illustrating fuel-linked engine operating parameters as a function of time. Specifically, FIG. 3 illustrates engine speed, fuel delivered with fuel system 60 (Fuel Value) and engine horsepower output (GHP). The maximum permissible fueling variation is shown as being in the range of about plus or minus 10%, for a total of about 20% of the desired value of the operating parameter. This is the case with engine speed as well. The precise magnitude of the permissible variability is, however, a function of the particular operating parameter being monitored.

It is noted from FIG. 3 that excessive variation is occurring in the fuel delivery and horsepower output of the engine, and these variations, which are more than 500% of the desired variation, are sufficiently egregious to compel the conclusion that fugitive fueling is occurring within the engine. In essence, controller 52 operates fuel system 60 to deliver an amount of fuel required to maintain the desired engine power output. And, with a properly operating engine which is not suffering from fugitive fueling, the variation of the fuel delivery or the resulting horsepower, should never exceed a very small fraction of the variation shown in FIG. 3. The uppermost plot of FIG. 3 shows an outcome of the fugitive fueling as an overspeed condition which occurs at the maximum time of the plot and which occurs even after the engine has been initially brought to a lower speed at a reduced throttle setting. Prior to onset of the overspeed condition, however, the excessive variability of the engine speed is itself a sufficient indicator that fugitive fueling is present to permit mitigation to be implemented.

Figure 4:
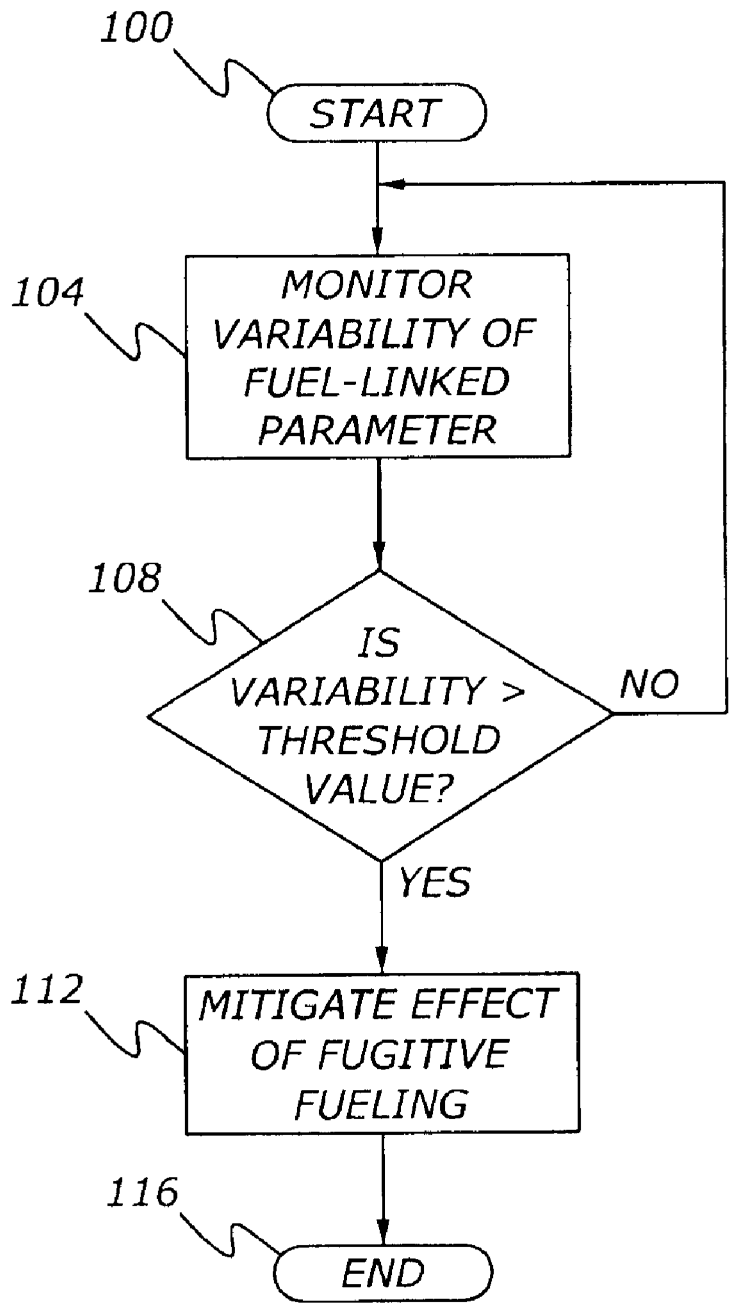
FIG. 4 is a flow diagram illustrating a method according to an aspect of the present invention.

FIG. 4 shows a method according to the present invention, which begins with a start block at 100. Controller 52 moves to block 104 wherein the time-related variability of at least one fuel-linked engine operating parameter is monitored. As noted above, the fuel-linked operating parameters may include such parameters as fuel delivery to the engine, engine horsepower output, or engine speed. What is important is that the measure or monitored engine operating parameter have a direct link to the fuel provided to the engine. At block 108, controller 52 compares the variability of a fuel-linked operating parameter with a threshold value which is a maximum permissible value for the variability of the operating parameter. If the variability is less than the threshold value at block 108, the routine continues with block 104. If, however, the variability is greater than the threshold value at block 108, the routine moves to block 112, wherein the effect of the fugitive fueling is mitigated. This mitigation may begin with the setting of a fugitive fueling flag to alert an operator, whether it be a human operator or controller 52, that fugitive fueling is occurring; the conclusion that fugitive fueling is occurring is followed by the employment of a mitigation device such as air shutter 44, or inert gas from tank 48, or the connection of engine 10 through alternator 64 with at least one self-load resistive element included as one of loads 68. Normal fueling may also be cut off by an appropriate command to fuel system 60. In any event, engine 10 will be stopped, or at least decelerated and speed-limited, before damage occurs.

Fuel delivery rate and its variability, and engine horsepower and its variability, may be measured either directly, in the case of fuel injectors, by noting the injector pulse width or the rack setting of the injectors. Horsepower may be determined by measuring the output of alternator 64 or by using a model running in controller 52. Such techniques are known to those skilled in the art and are beyond the scope of the present invention.

The foregoing invention has been described in accordance with the relevant legal standards, thus the description is exemplary rather than limiting in nature. Variations and modifications to the disclosed embodiment may become apparent to those skilled in the art and fall within the scope of the invention. Accordingly the scope of legal protection afforded this invention can only be determined by studying the following claims.

What is claimed is:

1. A system for detecting and responding to fugitive fueling of an internal combustion engine, comprising:

a controller for monitoring the variability of a fuel-linked engine operating parameter, with said controller comprising:

at least one device for measuring the value of said fuel-linked operating parameter;

a processor for calculating the variability of the measured operating parameter;

a comparator for comparing the calculated variability of the measured operating parameter with a maximum permissible value for said variability, with said controller setting a fugitive fueling flag if the result of such comparison indicates that fugitive fueling is present; and at least one engine shut down device, connected with said controller, and activated in response to said fugitive fueling flag, for stopping the engine notwithstanding the presence of fugitive fueling.

2. A system according to claim 1, wherein said engine shut down device comprises an air supply cutoff device.

3. A system according to claim 1, wherein said engine shut down device comprises at least one resistive element connected with a rotating electrical machine driven by the engine, whereby the engine will be loaded and decelerated.

4. A system according to claim 1, wherein said engine shut down device comprises a source of inert gas which may be furnished selectively to an air intake system of the engine.

5. A system according to claim 1, wherein the variability of said fuel-linked engine operating parameter is monitored as a function of time.

6. A system according to claim 1, wherein said fuel-linked engine operating parameter comprises engine power output.

7. A system according to claim 1, wherein said fuel-linked engine operating parameter comprises fuel delivery rate.

8. A system according to claim 1, wherein said fuel-linked engine operating parameter comprises engine speed.

9. A system according to claim 1, wherein said controller determines the maximum permissible value for variability as a function of a particular fuel-linked engine operating parameter being monitored.

10. A method for detecting and responding to fugitive fueling of an internal combustion engine, comprising:

monitoring the variability of a fuel-linked engine operating parameter;

comparing the monitored variability of said operating parameter with a maximum permissible value for the variability of said operating parameter; and if the monitored variability exceeds said maximum permissible value, taking steps to mitigate improper engine operation resulting from fugitive fueling.

11. A method according to claim 10, wherein said fuel-linked engine operating parameter is monitored for time-related variability.

12. A method according to claim 10, wherein said fuel-linked engine operating parameter comprises engine power output.

13. A method according to claim 10, wherein said fuel-linked engine operating parameter comprises engine speed.

14. A method according to claim 10, wherein said fuel-linked engine operating parameter comprises fuel delivery rate.

15. A method according to claim 10, wherein the maximum permissible value for the variability of said operating parameter is about 20% of the desired value for said operating parameter.

16. A method according to claim 10, wherein the maximum permissible value for the variability of said operating parameter is a function of the particular operating parameter being monitored.

17. A method according to claim 10, wherein said steps for mitigating improper engine operation comprise at least one of:

cutting off normal fuel delivery to the engine;

connecting a resistive element to a rotating electrical machine driven by the engine;

closing an air supply cutoff device associated with the engine; and infusing an inert gas into an air intake system of the engine.

* * * * *